United States Patent Office 3,819,652
Patented June 25, 1974

3,819,652
REDUCTION OF SULFONES
John Nicholson Gardner, Garrison, N.Y., assignor to
Hoffmann-La Roche Inc., Nutley, N.J.
No Drawing. Filed Sept. 18, 1972, Ser. No. 289,899
Int. Cl. C07d 63/10
U.S. Cl. 260—332.8
2 Claims

ABSTRACT OF THE DISCLOSURE

A process for reducing organic sulfones to organic sulfides by utilizing di(lower alkyl)aluminum hydrides.

BACKGROUND OF THE INVENTION

In the past, reducing techniques such as catalytic hydrogenation have been utilized to reduce sulfones to sulfides. These methods of converting a sulfone to a sulfide have required high temperatures, high pressures and long reaction times. The use of these excessive reaction conditions has made the conversion of sulfones to sulfides very expensive and not practical on a commercial scale. Therefore, it has been long desired to provide a means for converting sulfones directly into sulfides without utilizing excessive reaction conditions.

In the case where reducing agents such as nickel sulfides are utilized, these reducing agents are present in the reaction in their solid form. This makes it very difficult to carry out this reaction smoothly. Furthermore, it has been found that large excesses of these reducing agents must be utilized in order to obtain the conversion of a sulfone to a sulfide.

SUMMARY OF THE INVENTION

In accordance with this invention, it has been found that organic sulfones can be easily converted to their corresponding organic sulfides by reacting these sulfones with a di(lower alkyl) aluminum hydride. By utilizing this procedure, the sulfones are formed from the corresponding sulfides without the need for utilizing vigorous conditions such as high temperatures, elevated pressures and prolonged reaction times. In accordance with this invention, the process can be carried out at room temperature, atmospheric pressure and reaction periods of 5 hours or less.

DETAILED DESCRIPTION OF THE INVENTION

In accordance with this invention, any organic sulfone can be reduced to the corresponding sulfide via reduction with a di(lower alkyl) aluminum hydride. The organic sulfones include the aromatic, aliphatic or heterocyclic sulfones, where the aliphatic, aromatic or heterocyclic hydrocarbon moiety can be substituted, if desired, in one or more positions with a hydroxy moiety protected by a hydrolyzable protecting group.

Among the preferred sulfones for use in this invention are sulfones of the formula

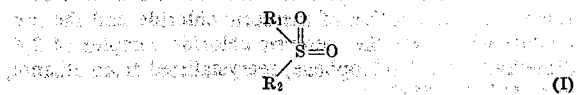

(I)

wherein $R_1$ and $R_2$ are individually alkyl, aryl or aralkyl or taken together with their attached sulfur atom form a 5 to 6 membered heterocyclic ring wherein the sulfur atom is the only hetero atom with said heterocyclic ring being unsubstituted or substituted in one or more positions with lower alkyl or hydroxy protected with a group convertible thereto by hydrolysis.

In accordance with one embodiment of this invention, the compounds of formula I are converted to a compound of the formula

$R_1$—S—$R_2$ (II)

wherein $R_1$ and $R_2$ are as above.

As used throughout the application, the term "alkyl" includes lower alkyl groups which contain from 1–7 carbon atoms such as methyl, ethyl, propyl, isopropyl, n-butyl, isobutyl, etc. as well as higher alkyl groups which contain from 8–20 carbon atoms such as n-tetradecyl, cetyl, etc. The term "aryl" as used throughout this application includes mono-nuclear aryl groups such as phenyl which can be unsubstituted or substituted in one or more positions with a lower alkyl group as well as polynuclear aryl groups such as naphthyl, anthryl, phenanthryl, azulyl, etc. which may be unsubstituted or substituted with one or more lower alkyl groups. The preferred aryl group is phenyl. The term "aralkyl" includes aryl lower alkyl groups wherein aryl and lower alkyl are defined as above. The preferred aralkyl group is benzyl.

When $R_1$ and $R_2$ are taken together with their attached sulfur atom in the compound of formula I to form a 5 to 6 membered heterocyclic ring wherein the sulfur atom is the only hetero atom, the preferred heterocyclic ring moieties are thiopyranyl, dihydrothiopyranyl, tetrahydrothiopyranyl, thienyl, dihydrothienyl and tetrahydrothienyl. The especially preferred heterocyclic ring moieties are thienyl, dihydrothienyl and tetrahydrothienyl. The heterocyclic ring moiety can be unsubstituted or substituted in one or more positions with lower alkyl or hydroxy protected with a group convertible thereto by hydrolysis.

Hydroxy group moieties can be protected by etherification of the hydroxy group. The suitable ether protecting group is, for example, tetrahydropyranyl ether. Other ethers are aryl methyl ethers such as, for example, benzyl, benzhydryl and trityl ethers, or α-lower alkoxy lower alkyl ethers, for example, methoxy methyl ether or allylic ethers.

Where adjacent positions on the heterocyclic ring are both substituted with a hydroxy group, these two hydroxy groups can be protected by forming acetals or ketals with aldehydes or ketones. Suitable aldehydes or ketones include lower alkanals of at least two carbon atoms, preferably from 2–6 carbon atoms such as para-aldehyde, propanal hexanal; di(lower alkyl) ketones such as acetone, diethyl ketone, dibutyl ketone, methyl ethyl ketone, and methyl isobutyl ketone; cycloalkanones such as cyclobutanone, cyclopentanone and cyclohexanone; cycloalkyl (lower alkanals) such as cyclopentylcarboxaldehyde and cyclohexylcarboxaldehyde; cycloalkyl lower alkyl ketones, such as cyclopentylpropyl ketones, cyclohexylmethylethyl ketones; etc.

In accordance with this invention, any organic sulfone can be reduced to the corresponding sulfide by treating the sulfone with a di(lower alkyl)aluminum hydride. Among the preferred sulfones for use in this invention are compounds of the formula I. In carrying out this reaction, temperatures of from 10° C. to 150° C. can be utilized. If desired, the reaction can be carried out at atmospheric pressure. However, reduced or elevated pressures can be utilized.

In carrying out this reaction, generally at least 2 moles of the di(lower alkyl)aluminum hydride is utilized per mole of the organic sulfone. Generally, from about 2.0 to 7 moles of the di(lower alkyl)aluminum hydride is utilized per mole of the organic sulfone. If desired, amounts of the di(lower alkyl)aluminum hydride greater than 7.0 moles per mole of the organic sulfone can be utilized. However, since no beneficial results are obtained by utilizing such large amounts, these large amounts are seldom utilized. In accordance with this invention, it is generally preferred to utilize from about 2.5 to 5 moles of the di(lower alkyl)aluminum hydride per mole of the organic sulfone.

The reaction to convert the organic sulfone to an organic sulfide can be carried out utilizing reaction times of less than 5 hours; about 3 hours. Generally, for best results, this reaction is carried out for a period of from 15 hours to about 90 hours. If desired, reaction times of greater than 90 hours can be utilized. However, since there is no additional benefit when utilizing such long reaction times, periods of greater than 90 hours are seldom utilized in carrying out the process of this invention.

In carrying out the process of this invention, any conventional inert organic solvent can be utilized. Among the preferred organic solvents are the aromatic solvents such as benzene or toluene. Since many of the organic sulfides are utilized in solvent systems, the sulfides need not be isolated from the reaction medium. This is true since the sulfides can be utilized dissolved in an organic medium. Furthermore, many of these sulfides are organic liquids and separation of these sulfides from the solvent in which it is formed is a rather cumbersome and difficult procedure. If desired, these sulfides can be separated by forming solid complexes with such substances as mercuric chloride.

On the other hand, if one desires to isolate these liquid sulfides, one utilizes high boiling solvents as the reaction medium during the conversion of the sulfone to the sulfide. Any conventional high boiling organic solvent having a boiling point of 140° C. or greater can be utilized as the solvent. The sulfone is coverted to the sulfide in the presence of a high boiling organic solevnt. The reaction mixture, after the conversion of the sulfone to the sulfide has been completed, is distilled. Distillation removes the thus formed sulfide from the reaction mixture leaving the organic solvent as the residue.

In forming the sulfide as an easily isolatible product, any conventional inert organic solvent having a boiling point of 140° C. or higher can be utilized. Generally, it is preferred to utilize solvents having a boiling point of from 200° C. to 400° C. Among the preferred high-boiling solvents are the long-chain hydrocarbon solvents such as docosane, dodecane, mineral oils, etc. as well as the high-boiling aromatic hydrocarbon solvents such as Decalin, terphenyl, etc.

The following examples are illustrative but not limitative of the invention. All temperatures are in degrees centigrade.

The mineral oil utilized in these examples is a mixture of aliphatic hydrocarbons which start to boil at 140° C. and 0.1 mm. Hg.

EXAMPLE 1

Reduction of di-n-butylsulfone

To a solution of 50 g. of di-n-butylsulfone in 100 ml. of toluene was added 740 ml. (4 eq.) of a solution containing 26% by weight of diisobutyl-aluminum hydride in toluene. The mixture was heated at reflux for 3 days. The reaction mixture was worked up by first cooling to room temperature, treating cautiously with isopropanol and then adding a saturated aqueous sodium sulfate solution. The toluene layer was analyzed by gas chromatography and showed a ratio of dibutylsulfide:dibutylsulfone of 26:1 parts by weight.

EXAMPLE 2

Reduction of di-n-propylsulfone

By the procedure of Example 1, di-n-propylsulfone was reduced to di-n-propylsulfide. A gas chromatographic analysis of the toluene solution showed only di-n-propylsulfide to be present.

EXAMPLE 3

Reduction of diphenylsulfone

A solution of 4.35 g. of diphenylsulfone in 200 ml. of toluene was treated with 66 ml. (5 eq.) of a solution containing 26% by weight of diisobutyl-aluminum hydride in toluene and heated at reflux overnight. After workup carried out in the manner of Example 1, a gas chromatographic analysis of the toluene solution showed the absence of the starting sulfone and only diphenylsulfide to be present.

EXAMPLE 4

Reduction of sulfolane

A solution of 2.37 g. of sulfolane in 20 ml. of toluene was treated with 60 ml. (5 eq.) of a solution containing 28% by weight diisobutylaluminum hydride in toluene and stirred at 25° C. for 17 hours. After working up in the manner of Example 1, the toluene solution was analyzed by gas chromatography. Only the product, tetrahydrothiophene was seen. A portion of the toluene solution was shaken with saturated aqueous mercuric chloride solution and the precipitate filtered and washed with water. The mercuric chloride complex of tetrahydrothiophene had a m.p. of 150–152° C.

EXAMPLE 5

Reduction of 3-sulfolene

A solution of 2.0 g. of 3-sulfolene in 20 ml. of toluene was cooled to 0° C. and treated with 60 ml. (5 eq.) of a solution containing 20% by weight of diisobutylaluminum hydride in toluene. After stirring at 25° C. for 18 hours, the reaction mixture was worked up in the manner of Example 1. The toluene solution was shaken with saturated aqueous mercuric chloride. The precipitated solid was recrystallized from aqueous dimethylsulfoxide to afford the mercuric chloride complex of 2,5-dihydrothiophene, m.p. 217–220° C.

EXAMPLE 6

Reduction of sulfolane-cis-3,4-diol acetonide

A solution of 2.0 g. of sulfolane-cis-3,4-diol acetonide in 200 ml. of toluene was treated with 50 ml. (5 eq.) of a solution containing 20% by weight of diisobutylaluminum hydride in toluene and heated at reflux for 18 hours. After working up the reaction on mixture by the procedure of Example 1, the toluene solution was shaken with a saturated aqueous solution of mercuric chloride to give a voluminous precipitate. After recrystallization from acetone-hexane, this mercuric chloride complex of tetrahydrothiophene-cis-3,4-diol acetonide had a m.p. of 143–144° C.

EXAMPLE 7

Reduction of 2,4-dimethylsulfolane

A solution of 3.0 g. of 2,4-dimethylsulfolane in 200 ml. of toluene was treated with 66 ml. (5 eq.) of a 20% solution of diisobutylaluminum hydride in toluene. After heating at reflux for 3 days, the reaction was worked up by the procedure of Example 1. The toluene solution was analyzed by gas chromatography which showed one major product 2,4-dimethyltetrahydrothiophene and no starting material. The toluene solution was shaken with a saturated aqueous solution of mercuric chloride and the precipitate which was the mercuric chloride complex of 2,4-dimethyltetrahydrothiophene, recrystallized from ethanol, m.p. 112–113.5° C.

EXAMPLE 8

Reduction of 3-methyl-3-sulfolene

A solution of 2.65 g. of 3-methyl-3-sulfolene in 200 ml. of toluene was treated with 66 ml. (5 eq.) of a solution containing 20% by weight of diisobutylaluminum hydride in toluene and heated at reflux overnight. The reaction mixture was worked up in the manner of Example 1. The toluene solution was analyzed by gas chromatography. Only the expected product (3-methyl-2,5-dihydrothiophene) and no starting sulfone were noted. The toluene solution was shaken with saturated aqueous solution of mercuric chloride and then precipitated material which was the mercuric chloride complex of 3-methyl-2,5-dihydrothiophene recrystallized from ethanol, m.p. 125–127° C.

EXAMPLE 9
Reduction of benzyl methyl sulfone

To a solution of benzyl methyl sulfone (6.8 g.) in toluene (500 ml.), there was added dropwise a solution of 20% by weight of diisobutylaluminum hydride in hexane (140 ml. of the 20% solution 5 eq.). The reaction mixture was heated under reflux and stirred for 18 hours. The reaction mixture was worked up by cooling and then adding saturated aqueous ammonium chloride solution until no more reaction occurred. The solids were removed by filtration and the filtrate was concentrated in vacuo to remove hexane and toluene. The residue was distilled under vacuum to yield benzyl methyl sulfide (30 g.); b.p. 38° C./0.25 mm. Hg. The distillation residue afforded 0.7 g. of the starting sulfone so that the yield of sulfide based on sulfone consumed was 61%.

EXAMPLE 10
Reduction of phenyl methyl sulfone

To a solution of phenyl methyl sulfone (11 g.) in toluene (500 ml.) was added dropwise a solution of 20% by weight diisobutylaluminum hydride in hexane (175 ml. of this solution, 5 eq.). The mixture was heated under reflux for 48 hours then worked up, filtered, concentrated and distilled as in Example 10. Phenyl methyl sulfide (4.6 g. b.p. 94°/0.25 mm. Hg, was isolated and 1.5 g. of the starting sulfone was recovered. The yield of sulfide based on sulfone consumed was 57%.

EXAMPLE 11

A solution of di-n-butyl sulfone (44.5 g., 0.25 mole) in toluene (50 ml.) was added to 500 ml. of a 23.5% solution of diisobutylaluminum hydride (0.75 mole) in toluene. The mixture was heated under reflux for 72 hours and cooled to room temperature, and ethanol (50 ml.) was cautiously added, followed by water (200 ml.) and concentrated hydrochloric acid (100 ml.). The organic layer was separated and washed with water (2× 50 ml.). The solvent was distilled off at a residue temperature of 120° C. at atmospheric pressure and the residue was distilled through a Vigreux column to yield the sulfide (18 g.); b.p. 60°/11 mm. Hg. Gas chromatographic evaluation of the residue from fractionation of the recovered solvent detected another 6.8 g. of sulfide, giving a yield of 24.8 g. (68%).

EXAMPLE 12

Light mineral oil (500 ml.) was added to 500 ml. of a 23.5% by weight solution of diisobutylaluminum hydride (0.75 mole) in toluene. The mixture was distilled to a residue temperature of 100° C. at 5 mm. Hg and then, while this vacuum and temperature were held, nitrogen was passed through the solution for 2 hours to remove the last traces of toluene. The mixture was cooled to 20–25° C. and sulfolane (30 g.; 0.25 mole) was added slowly while cooling to hold 20–25° C. The mixture was stirred for 1.5 hours and then distilled to a residue temperature of 125° at 3 mm. Hg. The distillate weighed 11.5 g. The reaction mixture was cooled to ambient temperature and again stirred for 72 hours. It was then distilled as before to yield a further 10 g. of distillate. The combined distillates were redistilled at atmospheric pressure via a 4" x 0.5" column to yield tetrahydrothiophene (16 g.; 73%); b.p. 121° C.

EXAMPLE 13

A solution of diisobutylaluminum hydride (0.75 mole) in mineral oil (500 ml.) was prepared as in Example 12. To this at 20° C. was added slowly 2,5-dihydrothiophene 1,1-dioxide (30 g.), the mixture being cooled as required. When the addition was complete, the reaction mixture was stirred for 1.5 hours and then distilled to a residue temperature of 150° C. at 4 mm. Hg. The distillate which weighed 10 g. was redistilled at atmospheric pressure and 122° C. through a 4" x 0.5" Goodloe column to yield 2,5-dihydrothiophene.

What is claimed is:

1. A process for preparing 2,5-dihydrothiophene comprising treating 3-sulfolene with a di(lower alkyl)aluminum hydride in the presence of an inert organic solvent at a temperature of from 10° C. to 150° C.

2. The process of claim 1 wherein said di(lower alkyl) aluminum hydride is diisobutylaluminum hydride.

References Cited

Bordwell et al.: J.A.C.S., vol. 73:2251–3 (May 1951).
Ziegler et al.: C.A., 50:6303–4 (June 1956).

HENRY R. JILES, Primary Examiner

C. M. S. JAISLE, Assistant Examiner

U.S. Cl. X.R.

260—327 TH, 332.2 R, 332.3 R, 332.3 H, 332.3 P, 609 R

UNITED STATES PATENT AND TRADEMARK OFFICE
CERTIFICATE OF CORRECTION

PATENT NO. : 3,819,652
DATED : June 25, 1974
INVENTOR(S) : JOHN NICHOLSON GARDNER It is certified that error appears in the above-identified patent and that said Letters Patent are hereby corrected as shown below:

Column 6, line 34, claim 1 "3-sulfolene" should be 3-sulfone $Signed and Sealed this Second Day of November 1976

[SEAL]

Attest:

RUTH C. MASON
Attesting Officer

C. MARSHALL DANN
Commissioner of Patents and Trademarks